United States Patent
Rogers et al.

(10) Patent No.: US 9,983,031 B2
(45) Date of Patent: May 29, 2018

(54) SENSORS WITH VIBRATION DAMPING

(71) Applicant: Kidde Technologies, Inc., Wilson, NC (US)

(72) Inventors: Aaron S. Rogers, Surf City, NC (US); Mahamadou Yamoussa, Raleigh, NC (US)

(73) Assignee: Kidde Technologies, Inc., Wilson, NC (US)

( * ) Notice: Subject to any disclaimer, the term of this patent is extended or adjusted under 35 U.S.C. 154(b) by 102 days.

(21) Appl. No.: 14/619,699

(22) Filed: Feb. 11, 2015

(65) Prior Publication Data
US 2016/0231145 A1  Aug. 11, 2016

(51) Int. Cl.
| | |
|---|---|
| G01D 3/10 | (2006.01) |
| G01D 11/10 | (2006.01) |
| G01D 11/24 | (2006.01) |
| F16F 15/02 | (2006.01) |
| G01K 1/08 | (2006.01) |

(52) U.S. Cl.
CPC ............ *G01D 11/245* (2013.01); *F16F 15/02* (2013.01); *G01D 3/10* (2013.01); *G01D 11/10* (2013.01); *G01K 1/08* (2013.01)

(58) Field of Classification Search
CPC ...................................................... B32B 5/02
USPC ............................................. 73/431; 374/185
See application file for complete search history.

(56) References Cited

U.S. PATENT DOCUMENTS

| | | | | |
|---|---|---|---|---|
| 5,775,049 A | * | 7/1998 | Fricke ....................... | B64G 1/22 52/167.6 |
| 5,820,348 A | * | 10/1998 | Fricke ....................... | F01D 5/027 188/268 |
| 5,891,328 A | * | 4/1999 | Goldstein ............ | B01D 53/228 204/627 |
| 7,254,984 B2 | * | 8/2007 | Weyl ...................... | G01K 13/02 204/424 |
| 7,682,076 B2 | * | 3/2010 | Landis .................... | G01K 1/10 338/238 |
| 2005/0201900 A1 | * | 9/2005 | Weyl ...................... | G01K 13/02 422/94 |
| 2010/0218708 A1 | * | 9/2010 | Carr .................... | E04G 23/0218 109/83 |

FOREIGN PATENT DOCUMENTS

| | | | |
|---|---|---|---|
| DE | 102006036500 B3 * | 2/2008 | .......... B23K 37/006 |
| WO | WO-2007/112434 A2 | 10/2007 | |

OTHER PUBLICATIONS

Extended European Search Report dated Jun. 13, 2016, issued during the prosecution of European Patent Application No. 16155171.8 (8 pages).

* cited by examiner

*Primary Examiner* — Harshad R Patel
*Assistant Examiner* — Jamel Williams
(74) *Attorney, Agent, or Firm* — Locke Lord LLP; Daniel J. Fiorello; Scott D. Wofsy

(57) ABSTRACT

A sensor includes a housing, at least one sensor component disposed within the housing such that there is space between the housing and the sensor component, and a vibrational damping material disposed within the space to dampen vibration of the sensor components relative to the housing. The sensor can be a thermal sensor. For example, the thermal sensor can be a linear thermal detector, an optical flame detector, or any other suitable type of sensor or combination of sensors.

11 Claims, 1 Drawing Sheet

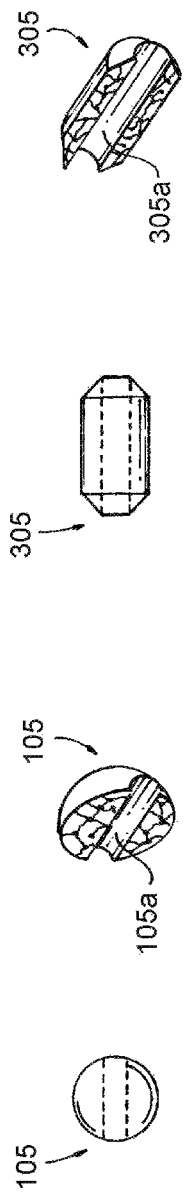
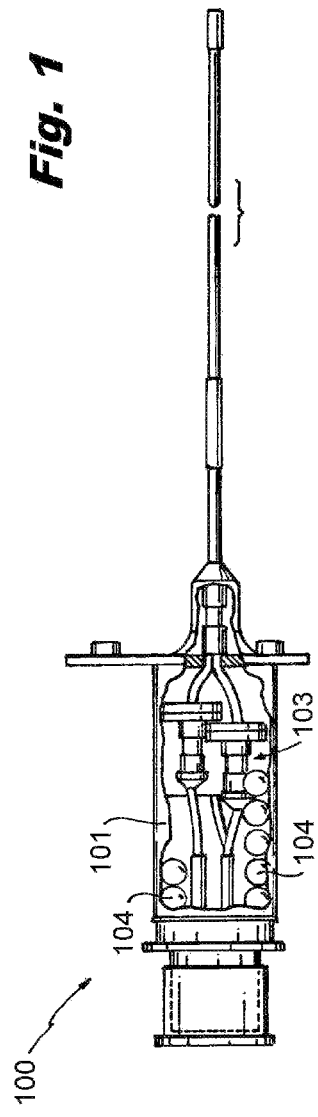
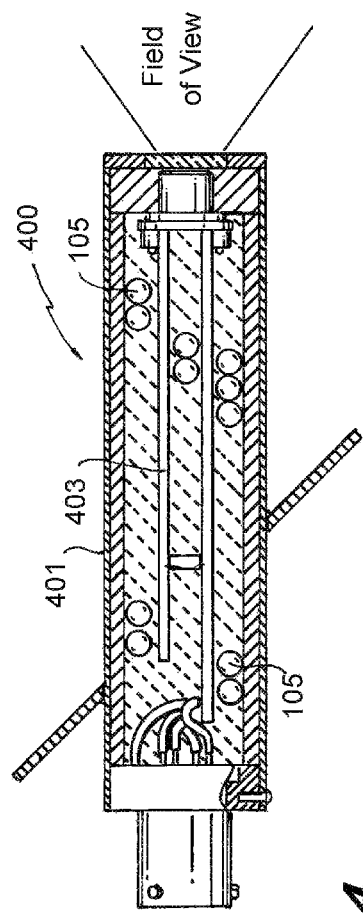

SENSORS WITH VIBRATION DAMPING

BACKGROUND

1. Field

The present disclosure relates to sensor systems, more specifically to sensors exposed to vibrational forces.

2. Description of Related Art

Thermal sensors used in high temperature, high vibration aerospace or off-road vehicle applications can require the use of sensitive components such as bi-metallic elements or pressure transducers and switches. These components are typically integrated into a rugged housing assembly that typically is filled with an inert gas or free air volume.

This free air volume is required to permit the micro-movements needed for the thermal sensors to perform their function, respond to a thermal excitation, and report an alarm condition. Due to the geometric arrangement of the internal components, traditional thermal sensors tend to fail at high vibration levels, especially when combined with excessive thermal loads. This is despite the fact that it is desirable for many sensors to function even after being exposed to fire, explosions, and high vibrational scenarios.

Such conventional methods and systems have generally been considered satisfactory for their intended purpose. However, there is still a need in the art for improved thermal sensors. The present disclosure provides a solution for this need.

SUMMARY

A sensor includes a housing, at least one sensor component disposed within the housing such that there is space between the housing and the sensor component, and a vibrational damping material disposed within the space to dampen vibration of the sensor components relative to the housing. The sensor can be a thermal sensor. For example, the thermal sensor can be a linear thermal detector, an optical flame detector, or any other suitable type of sensor or combination of sensors.

The vibrational damping material can include a sand. The sand can include silica. In certain embodiments, the vibrational damping material can include damper grains. The damper grains can include a hollow interior. The damper grains can be porous and/or include a ceramic.

The damper grains can have a spherical shape. The spherical damper grains can be between about 1.59 mm to about 3.18 mm in diameter. In certain embodiments, the damper grains can have a cylindrical shape. The cylindrical damper grains can have a length of up to about 6.35 mm and diameter of about 1.59 mm to about 3.18 mm in diameter, for example.

A method includes at least partially filling a space in a sensor housing with a vibrational damping material. The method can further include selecting at least one of a density of fill, a porosity of a grain of the vibrational damping material, a size of the grain, or a shape of the grain based on a predetermined vibrational characteristic.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a cross-sectional side elevation view of an embodiment of a sensor in accordance with this disclosure, showing a vibrational damping material disposed therein;

FIG. 2A is a side elevation view of an embodiment of a damper grain in accordance with this disclosure, showing a spherical shape of the damper grain;

FIG. 2B is a perspective cut-away view of the damper grain of FIG. 2A, showing the porosity of the damper grain;

FIG. 3A is a side elevation view of an embodiment of a damper grain in accordance with this disclosure, showing a cylindrical shape of the damper grain;

FIG. 3B is a perspective cut-away view of the damper grain of FIG. 3A, showing the porosity of the damper grain; and FIG. 4 is a cross-sectional side elevation view of another embodiment of sensor in accordance with this disclosure, showing a vibrational damping material disposed in the housing.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a sensor in accordance with the disclosure is shown in FIG. 1 and is designated generally by reference character 100. Other embodiments and/or aspects of this disclosure are shown in FIGS. 2A-4. The systems and methods described herein can be used to enhance vibrational tolerance of thermal sensors and the like.

Referring to FIG. 1, a sensor 100 includes a housing 101 and at least one sensor component 103 disposed within the housing 101 such that there is space between the housing 101 and the sensor component 103. A vibrational damping material 104 is disposed within the space to dampen vibration of the sensor components 103 relative to the housing 101.

As shown, the sensor 100 can be a linear thermal detector. However, referring to FIG. 4, an optical flame detector 400 includes sensor components 403 disposed in the housing 401 with damper grains 105 disposed therein. While the embodiments described above depict thermal sensors, it is contemplated that the vibrational damping material (e.g., including a sand and/or damper grains) can be utilized in any suitable sensor to provide vibrational damping. The sensors can be configured for use in an aircraft, off-road vehicle, or any other suitable location.

The vibrational damping material 104 can include sand. The sand can include silica or any other suitable material. The sand can be loosely disposed within the housing 101 such that the sensor components 103 can still move to function. The density of the pack and/or other attributes of the sand can be selected to provide a predetermined vibrational damping (e.g., optimized for one or more vibrational frequencies and/or amplitudes).

Referring to FIGS. 2A and 2B, in certain embodiments, the vibrational damping material 104 can include damper grains 105. The damper grains 105 can include a hollow interior (e.g., defined by a channel 105a). The damper grains 105 can be porous and/or include a ceramic (e.g., silica). The porosity, material selection, and/or hollowness can be selected to provide a predetermined vibrational damping.

In certain embodiments, the damper grains 105 can include a substantially spherical shape as shown in FIGS. 2A and 2B. The spherical damper grains 105 can be between about 1.59 mm to about 3.18 mm in diameter, however, it is contemplated that any suitable size can be selected to provide a predetermined vibrational damping.

Referring to FIGS. 3A and 3B, the damper grains 305 can include a cylindrical shape having a hollow interior (e.g., defined by a channel 305*a*). The cylindrical damper grains 305 can include a length of up to about 6.35 mm and a diameter of about 1.59 mm to about 3.18 mm in diameter, however, it is contemplated that any suitable size can be selected to provide predetermined vibrational damping.

While the shape of the damper grains 105 and 305 are shown as spherical and cylindrical, respectively, any suitable shape is contemplated herein. Also, any suitable combination of different shapes and/or sizes can be implemented in a single sensor. It is contemplated that the amount of damper grains 105, 305 utilized in the sensor 100, and the density in which the damper grains 105, 305 are packed into the sensor 100 can be selected to provide predetermined vibrational damping.

A method includes at least partially filling a space in a sensor housing 101 with a vibrational damping material 104. The method can further include selecting at least one of a density of fill, a porosity of a grain of the vibrational damping material 104, a size of the grain, or a shape of the grain based on a predetermined vibrational characteristic and/or to provide a desired vibrational damping.

The embodiments described above allow for sensors subject to vibration to dampen the vibration in order to prevent damage to the sensor components. Also, using a high porosity, low density ceramic or the like for damper grains allows enhanced damping without adding significant weight to the sensor device.

The methods and systems of the present disclosure, as described above and shown in the drawings, provide for sensors with superior properties including enhanced vibrational damping. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A sensor, comprising:
    a housing;
    at least one sensor component disposed within the housing such that there is space between the housing and the sensor component; and
    a vibrational damping material disposed within the space to dampen vibration of the sensor components relative to the housing, wherein the vibrational damping material includes damper grains, wherein the damper grains include a hollow interior defined by a single channel.

2. The sensor of claim 1, wherein the sensor is a thermal sensor.

3. The sensor of claim 2, wherein the thermal sensor is a linear thermal detector or an optical flame detector.

4. The sensor of claim 1, wherein the damper grains include silica.

5. The sensor of claim 1, wherein the damper grains are porous.

6. The sensor of claim 5, wherein the damper grains are ceramic.

7. The sensor of claim 5, wherein the damper grains include a cylindrical shape.

8. The sensor of claim 7, wherein the damper grains includes a length of up to about 6.35 mm and diameter of about 1.59 mm to about 3.18 mm in diameter.

9. The sensor of claim 1, wherein the damper grains include a spherical shape.

10. The sensor of claim 9, wherein the damper grains are between about 1.59 mm to about 3.18 mm in diameter.

11. A method, comprising:
    at least partially filling a space in a sensor housing with a vibrational damping material comprising damping grains having a single channel defined therethrough; and
    selecting a channel size of the single channel of the damping grains based on a predetermined vibrational characteristic.

* * * * *